United States Patent [19]

Ikesue

[11] Patent Number: 4,469,410
[45] Date of Patent: Sep. 4, 1984

[54] COMMON TRANSFER CONTACT FOR LIQUID CRYSTAL DISPLAY CELL OR ELECTROCHROMIC DISPLAY CELL

[75] Inventor: Isao Ikesue, Yamatokoriyama, Japan

[73] Assignee: Sharp Kabushiki Kaisha, Osaka, Japan

[21] Appl. No.: 919,927

[22] Filed: Jun. 28, 1978

[30] Foreign Application Priority Data

Jun. 29, 1977 [JP] Japan .................................. 52-78115

[51] Int. Cl.³ ......................... G02F 1/133; G02F 1/03
[52] U.S. Cl. ..................................... 350/343; 350/357
[58] Field of Search ........................ 350/334, 343, 357

[56] References Cited

U.S. PATENT DOCUMENTS 3,771,855 11/1973 Burns .............................. 350/334 X
3,936,930 2/1976 Stern .............................. 350/334 X

FOREIGN PATENT DOCUMENTS 2555822 3/1977 Fed. Rep. of Germany ...... 350/334

*Primary Examiner*—John K. Corbin
*Assistant Examiner*—David Lewis
*Attorney, Agent, or Firm*—Birch, Stewart, Kolasch & Birch

[57] ABSTRACT

A common transfer contact is provided with such an electro-optical display cell as a liquid crystal display cell or an electrochromic display cell for electrically connecting an electrode disposed on a substrate to a terminal arranged on another substrate. The common transfer contact is encircled by a seal material. The seal material is so arranged on the substrate as to occupy a larger area at the portion where the common transfer contact is provided than the remaining portion. Further the seal material can have a desired number of notches where the seal material is removed to ensure ready placement of the common transfer contact. At least, the common transfer contact is pre-heated before forced toward the seal material so that organic solvent contained with the material of the common transfer contact be in part eliminated. The pre-heating process is carried out at a temperature of 60°–70° C. for a period of 10–20 minutes.

19 Claims, 6 Drawing Figures

COMMON TRANSFER CONTACT FOR LIQUID CRYSTAL DISPLAY CELL OR ELECTROCHROMIC DISPLAY CELL

BACKGROUND OF THE INVENTION

The present invention relates to a structure of an electro-optical display cell such a liquid crystal display cell or an electrochromic display cell and, more particularly, to a common transfer contact of the same.

A common transfer contact made of, for example, Ag paste is provided within the liquid crystal display cell (referred to "LCD cell" hereinbelow). The common transfer contact serves to connect an electrode disposed on a substrate to another electrode arranged on another substrate. The common transfer contact is encircled by an insulating seal material. This LCD cell is completed by stressing the common transfer contact toward the insulating seal material. An organic solution remains within the common transfer contact so that the common transfer contact is soft.

Under some circumstances, upon application of pressure onto the common transfer contact toward the insulating seal material, Ag of the common transfer contact is dispersed to cause wrong connections between the two electrodes.

OBJECTS AND SUMMARY OF THE INVENTION

Accordingly, it is a primary object of the present invention to provide an improved structure of an LCD cell or an ECD cell.

It is another object of the present invention to provide an improved common transfer contact arranged for electrically connecting an electrode formed on a substrate to another electrode formed on another substrate.

Other objects and further scope of applicability of the present invention will become apparent from the detailed description given hereinafter. It should be understood, however, that the detailed description and specific example, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a common transfer contact is provided within an electro-optical display cell such as an LCD cell or an ECD cell for electrically connecting an electrode formed on a substrate of these cells to a terminal arranged on another substrate. The above mentioned electrode forms, for example, a display electrode, while the terminal is provided for carrying control signals applied to the display electrode.

The common transfer contact is made of, for example, Ag paste which contains a predetermined amount of organic solution.

The common transfer contact is encircled within a seal material which serves to seal a liquid crystal composition of the LCD cell or an electrolyte for the ECD cell. The seal material functions to ensure accurate placement of the two substrates of the LCD cell or the ECD cell. The seal material comprises epoxy resin mingled by glass powder. The seal material is formed on the substrate in accordance with a well known screen deposition. The portion where the common transfer contact is located in the seal material is wider than the remaining portion to strengthen the seal of the liquid crystal composition or the electrolyte.

After the common transfer contact is temporarily heated, the contact is pressed toward the seal material. According to the pre-heating of the common transfer contact, an organic solution contained within the common transfer contact can be in part removed, making the surface of the common transfer contact more solid. The common transfer contact can thus penetrate the seal material without dispersion of conductive material, namely, Ag in this case.

The pre-heating is performed at a temperature of 60°–70° C. for a period from ten to twenty minutes. The seal material can be further pre-heated in a manner similar to the common transfer contact.

Thereafter, both of the common transfer contact and the seal material are dried in accordance with successive increase of temperature, for example, 90° C. for an hour, and 115° C. for 1.5 hour and 130° C. for 1.5 hour, where the seal material is completely dried at the last temperature.

In another specific form, the common transfer contact can be located at the place where the seal material is cut out at the outer portion opposite to the cavity to fill the liquid crystal composition or the electrolyte.

BRIEF DESCRIPTION OF THE DRAWINGS

Other object and novel features of the present invention are set forth in the appended claims and the present invention as to its organization and its mode of operation will best be understood from a consideration of the following detailed description of the preferred embodiments taken in connection with the accompanying drawings, wherein:

DESCRIPTION OF THE PREFERRED EMBODIMENTS

Figure 1A:
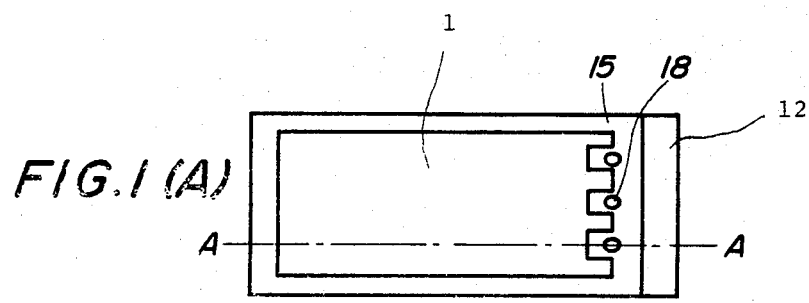
FIGS. 1(A) and 1(B) are a plane view of an LCD cell according to the present invention and a sectional view taken on line A—A of the same, respectively.
Figure 1B:
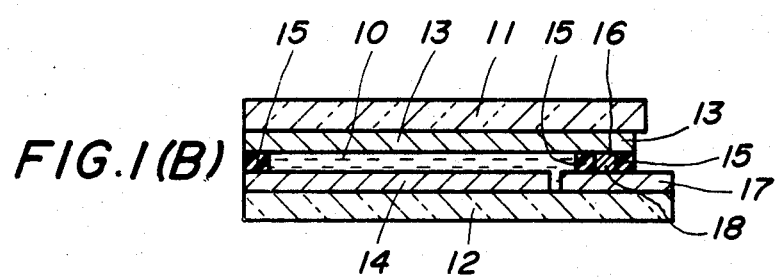
Figure 2:
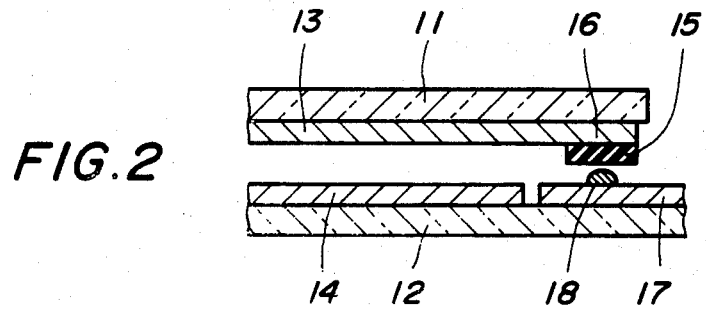
FIG. 2 is a cross-sectional view of the LCD cell shown in FIGS. 1(A) and 1(B) for showing a fabrication step of the LCD cell shown in FIGS. 1(A) and 1(B)

FIGS. 1(A) and 1(B) illustrate an LCD cell of the present invention in a plane view and a sectional view taken on line A—A, respectively.

The LCD cell comprises a pair of glass substrates 11 and 12, transparent, conductive layers 13 and 14 made of $In_2O_3$ each formed thereon, a liquid crystal composition 10 filled therebetween, a seal member 15, and a common transfer contact 18 made of a conductive material, for example, Ag paste. The seal member 15 is formed on the glass substrate 11 in accordance with a screen deposition process. The seal member 15 comprises epoxy resin mingled with glass powder, as is well known.

The seal member 15 has a wide portion where the common transfer contact 18 is to be located as shown in FIG. 1(A). The reason is that the seal member 15 can provide a complete seal for the liquid crystal composition 10. The common transfer contact 18 is disposed on a terminal 17 formed on the opposing glass substrate 12.

The terminal 17 is provided for being electrically related to the conductive layer 13 formed on the glass substrate 11 and isolated from the conductive layer 14 arranged on the glass substrate 12. The conductive layer 13 is adapted to be capable of indicating characters or symbols in relation with the conductive layer 14.

The common transfer contact 18 is encircled within the seal member 15 to electrically connect the conductive layer 13 to the terminal 17 by the following steps.

The common transfer contact 18 is temporarily heated at a temperature of 60°–70° C. for a period from ten to twenty minutes for eliminating an organic solution therewithin in part. The hardness of the surface of the common transfer contact 18 is much improved. Ag included within the common transfer contact 18 can not be dispersed to the extent necessary to cause improper contacts during the above temporary heating.

The seal member 15 can be temporarily heated in a manner similar to the common transfer contact 18.

The glass substrates 11 and 12 are adhered to each other and then ready for the following drying process of the LCD cell.

The seal member 15 is dried by successively increasing temperature up to its hardening temperature. The reason is that if the seal member 15 is abruptly subjected to high temperature near the hardening temperature, the seal member 15 loses its viscosity all of a sudden to thereby cause Ag included within the common transfer contact 18 to disperse. The dispersion presents the wrong contact problems. The temperature is, for example, increased up to 90° C. for an hour, 115° C. for 1.5 hours, and 130° C. for 1.5 hours which is the hardening temperature of the seal member 15.

Figure 4:
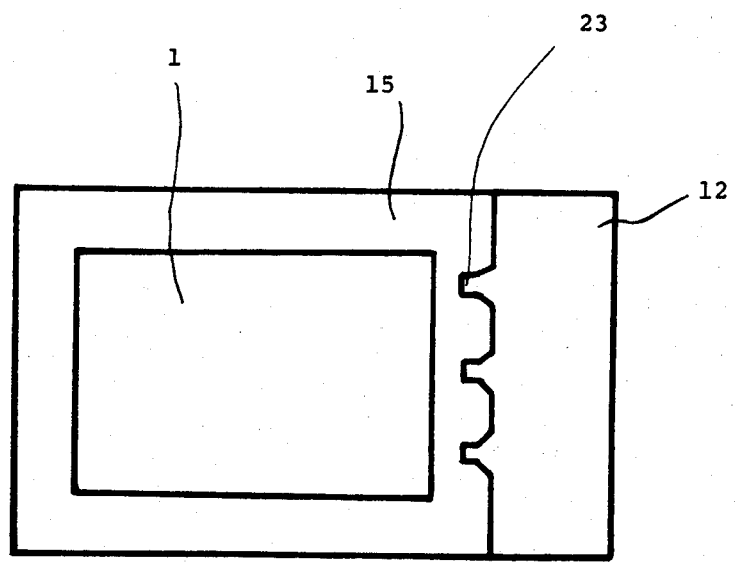
FIG. 4 is a plane view of another LCD cell according to the present invention.

Referring now to FIG. 4, another LCD cell of the present invention is shown, wherein the seal member 15 has a cut portion 23 where the common transfer contact 18 is located. According to the seal member 15 of the cut portion 23, the connection between the conductive layer 13 and the terminal 17 can be easily completed by merely the disposition of the glass substrates 11 and 12. The common transfer contact 18 can reach the conductive layer 13 without penetrating into the seal member 15. Therefore, a complete connection can be established in this configuration. The entire encirclement of the common transfer contact 18 by the seal member is achieved only by the disposition of the glass substrates 11 and 12.

Figure 3A:
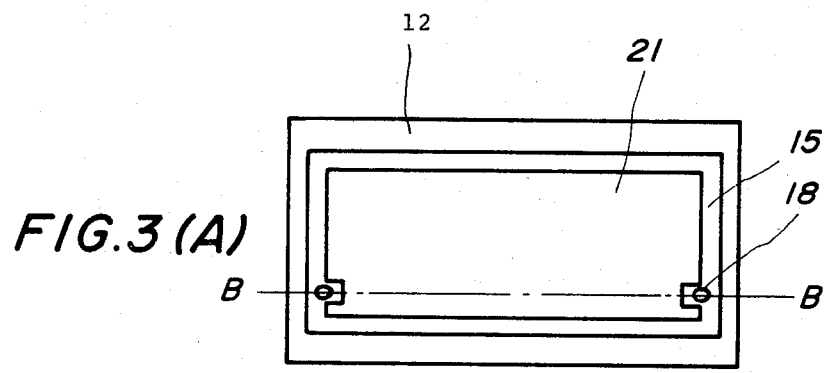
FIGS. 3(A) and 3(B) are a plane view of an ECD cell according to the present invention and a sectional view taken on line B—B of the same, respectively.
Figure 3B:
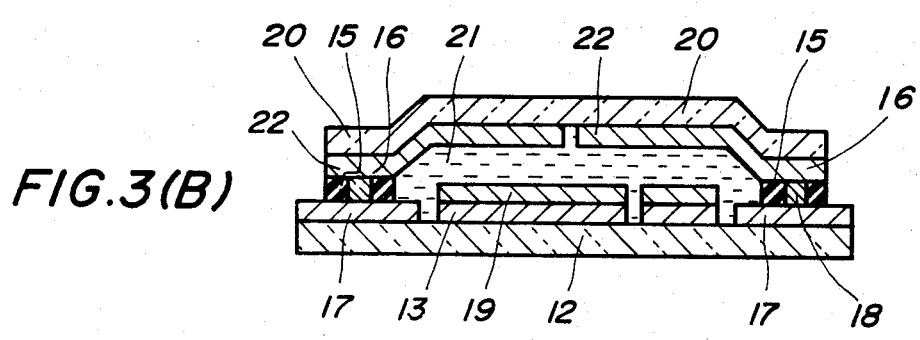

FIGS. 3(A) and 3(B) illustrate an ECD cell embodying the present invention. Like elements corresponding to those of FIGS. 1(A) and 1(B) are indicated by like numerals.

An electrochromic layer 19 such as tungsten oxide ($WO_3$) is provided for undergoing reversible color changes upon the application of an electric field. A dish shaped glass substrate 20 is arranged to form a cavity for the ECD cell together with the glass substrate 12. A counter electrode 22 is formed on the dish shaped glass substrate 20, the counter electrode being a transparent, conductive layer made of $In_2O_3$. The electrochromic layer 19 is formed on the conductive layer 13. An electrolyte 21 is filled within the cavity. The electrolyte 21 is a mixture of sulfuric acid, an organic alcohol such as glycerol, and a fine white powder such as $TiO_2$.

The commonly transfer contact 18 is provided for connecting the terminal 17 to the counter electrode 22. The commonly transfer contact 18 is enclosed in the seal member 15 as previously described. There is no limit to the number of the commonly transfer contacts 18.

While only certain embodiments of the present invention have been described, it will be apparent to those skilled in the art that various changes and modifications may be made therein without departing from the spirit and scope of the invention as claimed.

What is claimed is:

1. An electro-optical display cell comprising:
   a first conductive substrate having a relatively soft dielectric seal disposed thereon; and
   a second conductive substrate having a relatively hard conductive contact projection disposed thereon;
   said first and second conductive substrates being compressed together such that said relatively hard contact projection in mutual conductive contact with said substrates to conductively interconnect the latter.

2. The display cell of claim 1, wherein said relatively soft dielectric seal is formed of a mixture of epoxy resin and glass powder.

3. The display cell of claim 1, wherein said hard conductive contact projection is formed of a silver paste.

4. The display cell of claim 1, wherein said relatively soft dielectric seal has a cut out portion for receiving said relatively hard conductive contact projection.

5. An electro-optical display cell comprising:
   a first conductive substrate having a relatively soft dielectric seal disposed thereon; and
   a conductive substrate having a relatively hard conductive contact projection disposed thereon;
   said contact projection being merged with said dielectric seal to place said contact projection into mutually conductive contact with said substrates to conductively interconnect the latter.

6. An electro-optical display cell comprising:
   a first conductive substrate having a dielectric seal disposed thereon; and
   a second conductive substrate having a conductive contact projection disposed thereon;
   said first and second conductive substrates being compressed together such that said contact projection penetrates through said dielectric seal to contact said first conductive substrate and conductively interconnect said conductive substrates without dispersion of the conductive contact projection.

7. The display cell of any of claims 1, 5 or 6, wherein said dielectric seal totally surrounds said conductive contact projection.

8. An electro-optical display cell comprising:
   first and second conductive substrates;
   a dielectric seal formed between said first and second conductive substrates; and
   a conductive transfer contact disposed in mutual conductive contact with said substrates to conductively interconnect the latter, said conductive transfer contact being fully encased by said conductive substrates and said dielectric seal.

9. The display cell of claims 6 or 8, wherein said dielectric seal is formed of an epoxy resin and glass particles; and
   wherein said transfer contact is formed of a silver paste.

10. A method of manufacturing an electro-optical display cell having a contact formed between first and second conductive substrates comprising the steps of:

forming a relatively soft dielectric seal on the first conductive substrate;

forming a relatively hard conductive contact on the second conductive substrate;

pressing said first and second conductive substrates together to merge said relatively hard conductive contact with said dielectric seal and to place said conductive contact in mutual conductive contact with said substrates to conductively interconnect the latter.

11. The method of claim 10, wherein said relatively hard conductive contact is formed of silver paste containing an amount of organic solution.

12. The method of claim 11, wherein said step of forming said relatively hard conductive contact includes the step of heating said hard conductive contact to partially remove said organic solution.

13. The method of claim 12, wherein said step of heating is performed at a temperature of 60°–70° C. for a period of 10 to 20 minutes.

14. The method of claim 12, wherein said relatively soft dielectric seal is a mixture of epoxy resin and glass powder.

15. The method of claim 14, wherein said step of forming said relatively soft dielectric seal includes the step of heating said relatively soft dielectric seal.

16. The method of claim 10, further comprising the step of hardening said relatively soft dielectric seal by gradually heating said electro-optical display cell.

17. The method of claim 16, wherein the step of hardening is performed by gradually subjecting said display cell to successively higher temperatures over a period of time.

18. The method of claim 10, wherein the step of pressing causes said seal to totally surround said conductive contact.

19. The display cell produced by the method of claims 10, 11, 12, 13, 14, 15, 16, 17, or 18.

* * * * *